United States Patent

[11] 3,633,480

[72] Inventor Hidenobu Kondo
Kawasaki, Japan
[21] Appl. No. 86,142
[22] Filed Nov. 2, 1970
[45] Patented Jan. 11, 1972
[73] Assignee Nippon Kogaku K.K.
Tokyo, Japan
[32] Priority Nov. 27, 1969
[33] Japan
[31] 44/112100

[54] SAFETY WINDUP DEVICE FOR CAMERA
4 Claims, 6 Drawing Figs.
[52] U.S. Cl................................................. 95/31 FL,
95/31 AC
[51] Int. Cl....................................................... G03b 19/04
[50] Field of Search.......................................... 95/31 FL,
31 AC, 31 PM

[56] References Cited
UNITED STATES PATENTS
3,253,526 5/1966 Steisslinger.................... 95/31 FM
2,406,366 8/1946 Graef............................ 95/31 FL
2,770,177 11/1956 Faulhaber...................... 95/31 AC Primary Examiner—Samuel S. Matthews
Assistant Examiner—Monroe H. Hayes
Attorneys—Ward McElhannon and Brooks & Fitzpatrick ABSTRACT: A safety windup device used with a camera in which a shutter release shaft even in a somewhat lowered position may be raised by normal windup action into a position for permitting windup operation to be accomplished. The shutter release shaft has a beveled lower end face, and a release limiting member has a complementary beveled surface for cooperating with the beveled end surface of the shutter release shaft to raise the shaft.

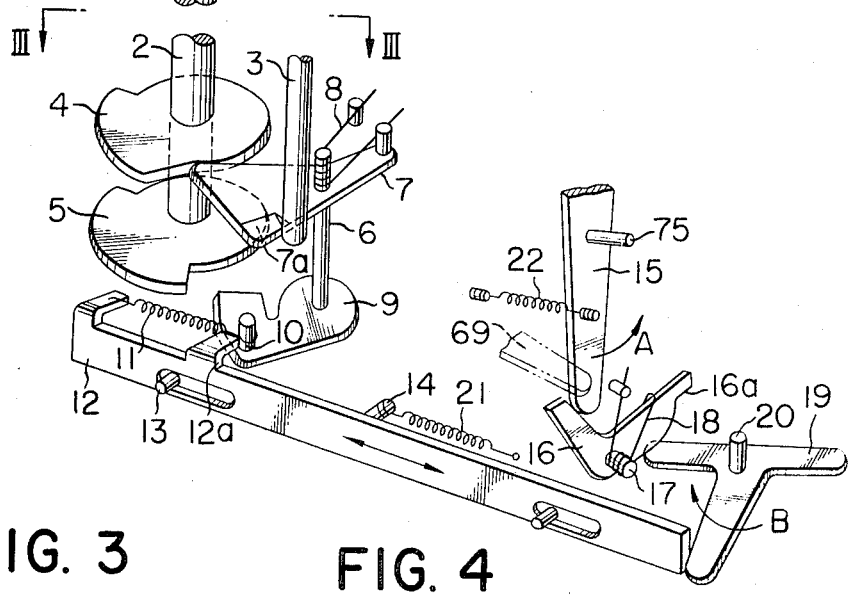
FIG. 2
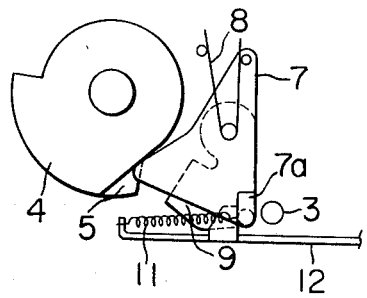
FIG. 3
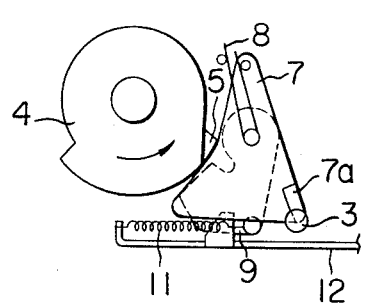
FIG. 4
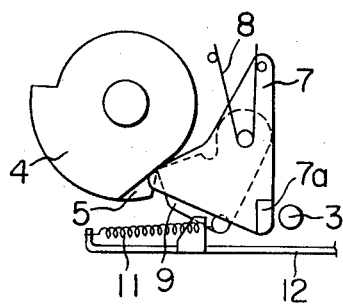
FIG. 5
FIG. 6
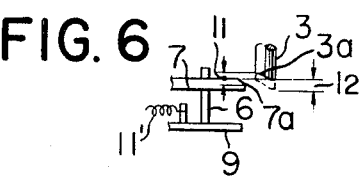

SAFETY WINDUP DEVICE FOR CAMERA

BACKGROUND OF THE INVENTION

1. Field of the Invention

This invention relates to a safety windup device used with a camera, and more particularly to improvements in the safety device for controlling the relationship between the film winding up and shutter charging and releasing in a camera of self-cocking type in which the shutter is charged interlocking with winding of the roll film.

2. Description of the Prior Art

The safety device in a camera is requisite to ensure a photograph to take place within each individual frame of photographing film contained in the camera. For this purpose, the following various requirements must generally be satisfied:

I. Shutter button cannot be depressed in the course of windup operation.

II. Shutter button cannot be depressed unless windup lever is returned to its initial or normal position.

III. Windup operation is not allowed to take place with the shutter button remaining depressed.

IV. Next windup operation is not allowed to take place unless the shutter completes its operation.

According to the prior art, the safety device has been of such construction that a requirement that "next windup operation is impossible unless the shutter button is depressed" is satisfied rather than the requirement (IV) above that "next windup operation is not allowed to take place unless the shutter completes its "operation."

Cameras incorporating such a safety device have a disadvantage that windup may take place during the shutter operation if the shutter speed is low, while other cameras of the type using a safety windup device released by depression of the shutter button just before the shutter operation are disadvantageous in that windup can take place even if the shutter is not operated. A further disadvantage encountered by the known cameras is that when an attempt is made to effect windup with a finger of the user resting on the shutter button during photographing, the shutter button tends to slightly move down to cause the windup mechanism to interfere with the safety device and hamper the windup operation.

SUMMARY OF THE INVENTION

The present invention contemplates to present a camera providing a safety windup device which positively satisfies the aforesaid various requirements (I) to (IV) and in which a shutter release shaft, even if in a somewhat lowered position, may be raised by normal windup action so as to permit the windup operation to be completed.

BRIEF DESCRIPTION OF THE DRAWINGS

FIG. 2 shows its principal portion thereof where the device is in a position after the shutter button is released but just before the windup operation takes place.

FIG. 3 is a plan view taken along line III—III of FIG. 2.

FIG. 4 is a plan view similar to FIG. 3 but showing the device as it is in the course of windup operation.

FIG. 5 is a plan view again similar to FIG. 3, but showing the device in a position after the windup operation has been completed with the windup lever returned to its initial or normal position.

FIG. 6 is a fragmentary front view showing the shutter release shaft and release limiting member of FIG. 2.

DESCRIPTION OF THE PREFERRED EMBODIMENT

Figure 1:
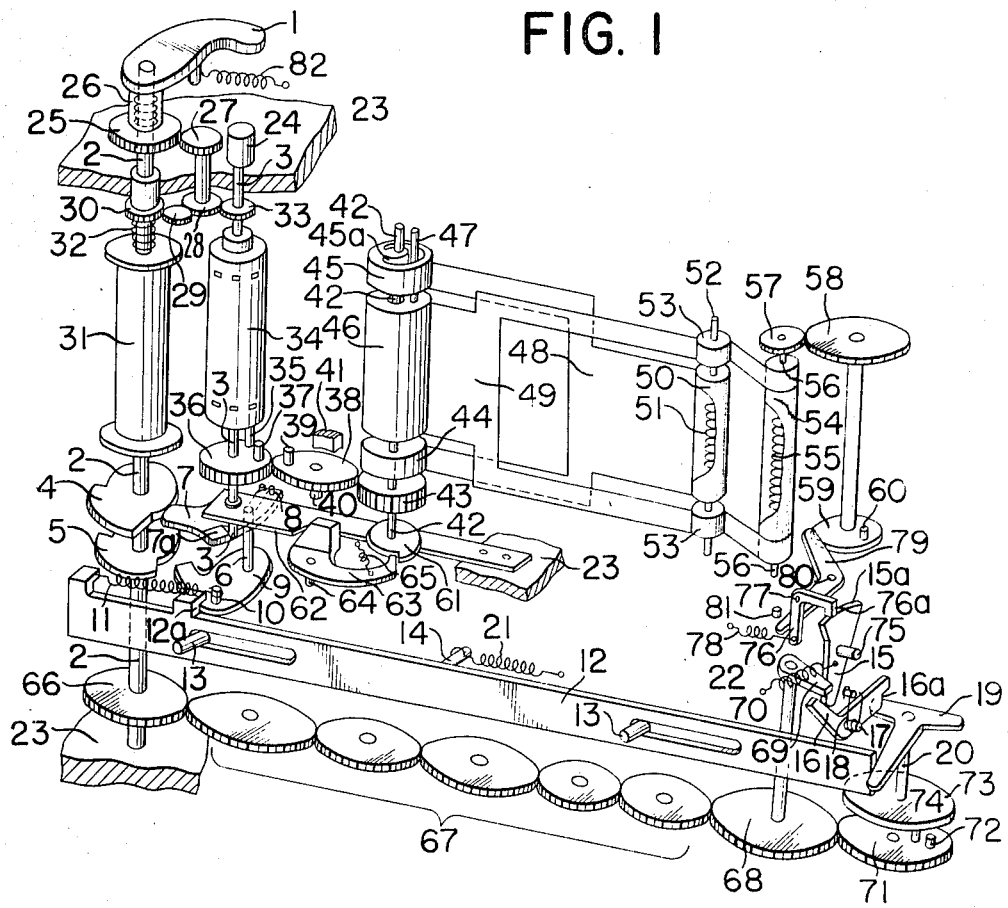
FIG. 1 is a perspective view of the safety windup device embodying the present invention.

Referring to FIG. 1, a windup lever 1 is secured to a windup shaft 2. A shutter release shaft 3 has at its lower end a sloped end face 3a formed at one end thereof as clearly shown in FIG. 6. A release control cam member 4 and a windup limiting cam member 5 are securely mounted on the windup shaft 2 below the windup lever 1. A rotary shaft 6 has a release limiting member 7 rotatably mounted thereon and having a sloped surface 7a opposed and complementary to the sloped end face 3a of the shutter release shaft 3. The release limiting member 7 is urged clockwise by a spring 8 so that one end thereof may be in contact with the release control cam member 4.

The release limiting member 7 and the release control cam member 4 are arranged such that when the windup lever 1 is rotated for windup, the release control cam member 4 is also rotated to thereby rotate the release limiting member 7 counterclockwise about the shaft 6 against the force of the spring 8 so as to prevent the shutter release shaft 3 from lowering, that when the windup lever 1 is returned to its initial or normal position the release limiting member 7 is retracted by the spring 8 into such a position as to permit the lowering of the shutter release shaft 3, and that after a shutter button 24 is depressed but just before the windup operation is started, the release limiting member 7 engages the release limiting cam member 4 with the aid of the spring 8 so as to assume such a position as to permit the lowering of the shutter release shaft 3.

A windup limiting lever 9 is rotatably mounted on the rotary shaft 6 and has a pin 10 studded therein. A spring 11 has one end thereof secured to the pin 10 on the windup limiting lever 9 and the other end secured to one end of a slide member 12. The slide member 12 is slidable in opposite directions as indicated by the double-headed arrow D, E, through the cooperation between slots formed therein and a slide guide pin 13 received in each of the slots. The slide member 12 is normally urged rightwardly, as viewed in FIG. 1, by a spring 21 secured to a pin 14 extended laterally from the slide member 12.

The windup limiting cam member 5 and the windup limiting lever 9 are arranged such that when the windup lever 1 is being rotated the windup limiting lever 9 is rotated by means of spring 11 with the sliding movement of the slide member 12 so as to engage the circumference of the windup limiting cam member 5, that upon return of the windup lever 1 to its initial position the windup limiting lever 9 comes, with the aid of the spring 11, into such a position as to prevent the windup rotation of the windup limiting cam member 5, and that after the shutter button 24 is depressed but just before the windup operation is started, the windup limiting lever 9 assumes its retracted position due to engagement taking place between the projection 12a of the slide member 12 and the pin 10 on the lever 9.

A kick lever 15, partly shown, having a sector 15a at one end is provided in overlying relationship with a key lever 16 having a key portion 16a pivotally mounted by means of rotary pin 17 and urged clockwise by spring 18. A charge lever 19 for the slide member 12 is pivotally mounted by means of pin 20 projected from the lever 19. A return spring 22 is connected to the kick lever 15.

In FIG. 1, 23 shows a camera body, and the shutter button 24 is connected to the release shaft 3; a windup gear 25 is connected to the windup lever 1 through one-way clutch 26 and receives the windup operation of the lever 1. A transmission gear system consists of three gears 27, 28 and 29, where gears 27 and 28 are rotated in unison. A spool rotating gear 30 and a spool 31 are mounted on the windup shaft 2 relatively rotatable thereto, and the gear 30 and the spool 31 are connected through a coil spring 32 for transmitting the motion. A gear 33 is mounted on the shaft 3 rotatable in unison therewith, and a sprocket 34 is mounted on the release shaft 3 relatively rotatable therewith and has at its lower end a pin 35. A clutch gear 36 is formed in unison with the release shaft 3, and through a pin 37 planted on the upper surface of the gear 36, the anticlockwise rotation of the release shutter 3 is transmitted to said sprocket pin 35. A stop gear 38 has at its upper surface a restriction pin 39 and is supported rotatably by a shaft 40. A windup restriction part 41 is provided at camera body 23 and when said restriction pin abuts both end surfaces of said restriction part 41, the rotation of the stop gear 38 is restricted and the windup operation of the lever 1 is also restricted. With the rotation of the stop gear 38 by a restricted rotational angle, said sprocket 34 is rotated by an amount to transfer one frame of the film. A first charge gear 43 is formed in unison with a shutter charge shaft 42, and front curtain pulleys 44 and 45 are mounted on the charge shaft 42 rotatable in unison, and on one of the pulleys 45, a groove 45a is formed. A rear curtain pulley 46 is mounted on the shaft 42 relatively rotatable thereto and it is interlocked to a delay actuation mechanism for the rear curtain through a connecting pin 47 passing through said groove 45a of the pulley 45.

A front curtain 48 and a rear curtain 49 form a usual focal plane shutter, and a drum 50 is to wind up the front curtain 48 with the aid of an energized spring 51 provided within the drum, and the drum 50 is mounted on a rotating shaft 52; 53 is a guide roller for the rear curtain, and a drum 54 is to wind up the rear curtain 49 with the aid of an energized spring 55 installed within the drum 54, which is mounted on a shaft 56 corotatable in unison, and on the shaft 56 a drum gear 57 is mounted rotatable therewith. A signal gear 58 is provided for amplifying the rotational angle of the drum gear 57, and a signal disc 59 having a signal pin 60 on its upper surface is formed in unison with the signal gear 58. An initiating cam 61 is provided rotatably in unison with the charge shaft 42 and has at its periphery a recess for restricting the movement of the cam 61. An initiating plate spring 62 is fixed at its one end to the camera body 23 and at its the other end, is engaged with the release shaft vertically shiftable together with the release shaft 3. After the shutter button 24 is depressed, the finger is removed from the button 24, then the button 24 is returned to its original position with the aid of the plate 62. An intermediate lever 63 is rotatably supported by a shaft 64 for interlocking the initiating cam 61 and the plate spring 62. One end of the lever 63 is formed in pawl shape engageable with the recess of the cam 61 and inclined surface of the lever 63 engages with the notch in the plate spring 62, and reference numeral 65 shows a returning spring. The cam 61, spring 62 and the lever 63 are arranged such that, when the shutter is released, the release shaft 3 is lowered and the initiating plate spring 62 is pushed down, the notch of the spring 62 rotates the intermediate lever 63 clockwise so as to disengage the pawl portion of the lever 63 from the recess of the cam 61 to actuate the shutter, and when the film is wound up, the initiating cam 61 is rotated and when the recess thereof faces to the pawl portion of the lever 63, the pawl portion engages with the recess by the energy of the return spring 65 so as to prevent the initiating cam from rotating in clockwise. A main gear 66 is provided rotatable in unison with the windup shaft 2, 67 is a transmission gear train and 68 is a second charge gear connected to the gear train 67. A lever 69 is to rotate the lever 15 and connected to the second charge gear 68 through the shaft 70. A third charge gear 71 engages with the second charge gear and on the upper surface of the third gear a clutch pin 72 is fixed. A clutch disc 73 is supported by the shaft 20 rotatable in unison with the slide plate charge lever 19 and on the lower surface of the disc 73, a pin 74 is planted.

The third gear 71, clutch pin 72, clutch disc 73 and pin 74 are so arranged that when the film is wound up and the third charge gear 71 rotates in clockwise, the clutch pin 72 pushes the pin 74 so that the rotation of the gear 71 is transmitted to the clutch disc so as to slide the slide plate 12 to the left, in the direction of D, through the slide plate charge lever 19. A stop lever 76 is rotatably supported by the shaft 77 and one end 76a of which projects into the rotating locus in the clockwise direction of the lever 15 and the lever 76 is energized to be rotatable in the clockwise direction by a weak spring 78. A bell crank 79 is rotatably mounted on a shaft 80, and one end of the crank 79 abuts one end of the lever 76 and the other end of the crank 79 is engageable with the signal pin 60, and a stopper 81 is to hold the crank 79 to a position engageable with the signal pin 60, and a spring 82 is to return the windup lever 1 to its initial position.

When the windup lever 1 is wound up in counterclockwise direction in the drawing, the second and third charge gears 68 and 70 are rotated by the main gear 66 so as to rotate the lever 15 counterclockwise. Upon completion of the rotation of the lever 15, one end 76a of the lever 76 abutting the sector 15a rotates clockwise by the energy of the spring 78 so as to prevent the lever 15 from rotating reversely due to the spring 22. At this moment, the bell crank 79 is pushed to the stopper 81 by the other end of the stop lever 76. While the disc 73 rotates clockwise as the third gear 71 rotates so that the slide plate charge lever 19 is also rotated. At this time, the key lever 16 rotates clockwise by the spring 18 for preventing the lever 19 from rotating reversely. When the shutter is actuated and the rear curtain is completely wound up on the rear curtain takeup drum 54, said signal pin 60 rotates the bell crank 79 to counterclockwise direction. Consequently, the stop lever 76 rotates counterclockwise against the spring 78 to release the lever 15 which in turn rotates the key lever 16 counterclockwise with the aid of the spring 22 and the slide plate 12 returns to its initial position while rotating the lever 19 counterclockwise by the spring 21. At this time, the clutch pin 72 has already been returned to its position before winding up so that it can rotate the disc 73 counterclockwise.

Before the windup operation takes place, the shutter release shaft 3 may be lowered freely as shown in FIGS. 1, 2 and 3 but after the windup is effected by rotating the windup lever 1, the release limiting member 7 is rotated counterclockwise about the shaft 6 against the force of the spring 8 by the release control cam member 4 until the release limiting member 7 comes to a position of FIG. 4 for preventing the lowering of the shutter release shaft 3. When the windup lever 1 returns to its initial position, the release limiting member 7 is retracted by the spring 8 to a position of FIG. 5 for permitting the lowering of the shutter release shaft 3. This means that the requirements mentioned previously under items (I) and (II) are satisfied.

When the shutter release shaft 3 is lowered by depression of the shutter button 24, the sidewall of that shaft 3 interferes with the rotation of the release limiting member 7 to thereby inhibit the windup operation. Thus, the requirement (III) above is also satisfied.

If the amount of depression $l_2$ of the shutter release shaft 3 resulting from the depression of the shutter button is less than the vertical distance $l_1$ defined between the sloped end face 3a of the shutter release shaft 3 and the sloped surface 7a of the release limiting member 7 as shown in FIG. 6, the shutter release shaft 3 may be raised by the sloped surface 7a to such a degree as to permit the windup operation to be effected. This means that the inconvenient interference imparted to the windup lever is eliminated to allow its rotation.

The windup rotation of the windup lever 1 also forces the kick lever 15 and slide charge lever 19 to rotate in the directions A and B respectively (FIG. 2), whereafter the kick lever 15 is retained in its rotated position. Since the kick lever 15 thus rotated allows the key lever 16 to be rotated clockwise by the urge of the spring 18, the key portion 16a of the key lever 16 now engages the corresponding end of the slide charge lever 19 to thereby retain that lever 19 in its rotated position. The rotation of the slide charge lever 19 also causes the slide member 12 to move leftwardly as viewed in FIG. 2, thereby charging the springs 11 and 21. The charged spring 11 attempts to rotate the windup limiting lever 9 in the clockwise direction, so that the windup limiting lever 9 comes into engagement with the circumference of the windup limiting cam member 5 in the course of windup operation (FIG. 4), but upon return of the windup lever 1 to its initial position the windup limiting lever 9 comes to a further engaging position for blocking the rotation of the windup lever 1 (FIG. 5).

By depressing the shutter button 24 to operate the shutter and then releasing the retention of the kick lever 15 with the aid of a signal of the signal pin 60 of the shutter, the kick lever 15 is returned to its initial position by the action of the return spring 22. In the course of such return, the lower end of the kick lever 15 kicks the key lever 16 at the other end thereof than the key end 16a, to thereby rotate the key lever 16 in the counterclockwise direction, whereby the key lever 16 is disengaged from the slide charge lever 19. As a result, the slide member 12 is moved rightwardly to return to its initial position by the spring 21. Thereupon, the projection 12a of the slide member 12 pushes the pin 10 on the windup limiting lever 9, which is thus rotated counterclockwise into a position for permitting the rotation of the windup lever 1. In this way, the requirement (IV) mentioned previously is also satisfied.

According to the present invention, as has been described hitherto, a part of the safety device is forced to move in response to the windup lever so as to enable the windup operation to take place even with the shutter release shaft depressed a predetermined amount. This means a great convenience in use which could never be achieved by the prior art.

Furthermore, the retention imparted to the windup lever is released by the signal produced after completion of the shutter operation, and this ensures windup operation to be inhibited during the shutter operation as well as eliminates any lost motion of the windup lever which may result from the premature release of that lever just before the shutter operation.

It will thus be appreciated that the device of the present invention can achieve a reliable performance as a safety device by perfectly satisfying all the requirements imposed upon such device.

What is claimed is:

1. A safety windup device comprising a release control cam member and a windup limiting cam member both securely mounted on a common windup shaft, a release limiting member adapted to retain a shutter release shaft in response to actuation of said release control cam member, said shutter release shaft having a sloped end face at one end thereof, said release limiting member having a sloped surface opposed and complementary to said sloped end face of said shutter release shaft, a windup limiting lever adapted to retain said windup limiting cam member, and a slide member adapted to engage and disengage said windup limiting lever with said windup limiting cam member in response to windup operation and completed shutter operation.

2. A safety windup device according to claim 1, wherein a means is provided to actuate said slide member to effect said engagement and disengagement.

3. A safety windup device according to claim 1, wherein said sloped surface of said release limiting member and said sloped end face of said shutter release shaft are vertically spaced apart a predetermined distance to permit said shutter release shaft, if lowered to a certain degree, to be raised by said release limiting member.

4. A safety windup device according to claim 2, wherein said means for actuating said slide member comprises a combination of spring and lever means.

* * * * *